United States Patent [19]
Buck et al.

[11] Patent Number: 5,537,646
[45] Date of Patent: Jul. 16, 1996

[54] APPARATUS INITIALIZED FOR SELECTED DEVICE BASED UPON TIMING, INTERRUPT, AND DMA CONTROL COMMANDS WITHIN CONFIGURATION DATA PASSED FROM PROCESSOR TO TRANSFER DATA TO SELECTED DEVICE

[75] Inventors: David L. Buck, San Diego; Roger E. Hall, La Mesa; Ronald L. Bruck, San Diego, all of Calif.

[73] Assignee: The United States of America as represented by the Secretary of the Navy, Washington, D.C.

[21] Appl. No.: 979,499

[22] Filed: Nov. 19, 1992

[51] Int. Cl.[6] ................................. G06F 15/40
[52] U.S. Cl. .................. 395/500; 395/830; 395/843; 395/550; 364/228.5; 364/238.3; 364/240.3; 364/DIG. 1
[58] Field of Search ................. 395/275, 250, 395/550, 425, 500, 700, 725, 830, 843; 364/228.5, 238.3, 240.3, 240.5, 239

[56] References Cited

U.S. PATENT DOCUMENTS

| | | | |
|---|---|---|---|
| 4,467,445 | 8/1984 | Mueller et al. | 379/98 |
| 4,539,655 | 9/1985 | Trussell et al. | 395/280 |
| 4,562,532 | 12/1985 | Nishizawa et al. | 395/497.01 |
| 4,589,106 | 5/1986 | Prather et al. | 370/58.2 |
| 4,688,170 | 8/1987 | Waite et al. | 395/500 |
| 4,700,358 | 10/1987 | Duncanson et al. | 375/222 |
| 4,701,845 | 10/1987 | Andreasen et al. | 395/183.07 |
| 4,722,070 | 1/1988 | Dye | 395/550 |
| 4,807,282 | 2/1989 | Kazan et al. | 379/284 |
| 4,943,907 | 7/1990 | Godwin | 395/775 |
| 5,101,490 | 3/1992 | Getson, Jr. et al. | 395/835 |
| 5,133,071 | 7/1992 | Sato et al. | 395/700 |
| 5,151,986 | 9/1992 | Langan et al. | 395/550 |
| 5,220,659 | 6/1993 | Larson et al. | 395/500 |
| 5,237,692 | 8/1993 | Raasch et al. | 395/740 |
| 5,280,589 | 1/1994 | Nakamura | 395/309 |
| 5,305,436 | 4/1994 | Mundkur | 395/162 |
| 5,317,693 | 5/1994 | Cuenod et al. | 395/829 |
| 5,371,892 | 12/1994 | Petersen et al. | 395/700 |
| 5,379,382 | 1/1995 | Work et al. | 395/883 |
| 5,428,748 | 6/1995 | Davidson et al. | 395/829 |

Primary Examiner—Thomas C. Lee
Assistant Examiner—Moustafa M. Meky
Attorney, Agent, or Firm—Harvey Fendelman; Michael A. Kagan; Peter A. Lipovsky

[57] ABSTRACT

A communication interface circuit for interfacing a processor with a plurality of application devices is provided. Circuitry monitors input/output (I/O) addresses passed on the processor's data transfer bus and provides a first enable signal when an I/O addresses indicates that operation of the communication interface circuit has been requested by the processor. Control logic, in response to the first enable signal, is then given access to configuration data passed on the data transfer bus associated with the one I/O address. The control logic interprets the data and produces a second enable signal in accordance therewith. A plurality of programmable controllers, in response to the second enable signal, are initialized by the configuration data. The interface circuit is then configured for a selected one of the application devices in terms of timing control, interrupt control and direct memory access control (DMA). A serial communication controller serializes application data when the serial communication controller receives the second enable signal. The serialized data is then passed to the selected one application device in accordance with the enabled interrupt, the selected one DMA line and the provided timing control rate.

8 Claims, 16 Drawing Sheets

APPARATUS INITIALIZED FOR SELECTED DEVICE BASED UPON TIMING, INTERRUPT, AND DMA CONTROL COMMANDS WITHIN CONFIGURATION DATA PASSED FROM PROCESSOR TO TRANSFER DATA TO SELECTED DEVICE

STATEMENT OF GOVERNMENT INTEREST

The invention described herein may be manufactured and used by or for the Government of the United States for governmental purposes without the payment of any royalties thereon or therefor.

FIELD OF THE INVENTION

The present invention relates to the field of data communication between a personal computer (PC) and peripheral devices, and more particularly to a PC compatible communications card having software selectable interrupts, direct memory access and timing.

BACKGROUND OF THE INVENTION

Advances in a PC's processing capability and speed has developed to the point that PC's are now utilized where previously only mainframes would suffice. Accordingly, many current PC users require the services of a wide variety of peripheral devices (e.g., printer, modem, mouse, FAX, scanner, etc.). All of the peripherals typically need to be connected to the PC via some standard connector such as the RS422 (commercial applications) or the MIL-STD-188-114 (military applications). Furthermore, current PCs operate from microprocessor speed ranges of a PC/AT (or ISA bus as it is now known)to that of a 486 microprocessor. Currently, communication cards (as they are known in the art) are available to provide the necessary link between a PC and its peripheral devices. Unfortunately, these cards are typically limited by a particular processing speed, one or two channels of communication, and hardware set jumpers or switches defining interrupts and choice of memory access lines.

Thus, there is a need for a versatile communications card that is compatible with a variety of PC processing speeds, that offers a plurality of communications channels for the connection of a plurality of peripheral devices via standard connectors, and whose control is not governed by manually set hardware jumpers and switches.

Accordingly, it is an object of the present invention to provide a communication circuit that interfaces a processor with a plurality of application devices.

Another object of the present invention is to provide a communication circuit that interfaces a state-of-the-art microprocessor with a plurality of application devices operating at a plurality of processing speeds otherwise known as baud rates.

A further object of the present invention is to provide a communication interface circuit for simultaneously servicing a plurality of Military Standard MIL-STD-188-114 communication channels operating with a plurality of application devices.

Still another object of the present invention is to provide a communication interface circuit with software selectable interrupts and software selectable direct memory access lines.

SUMMARY OF THE INVENTION

In accordance with the present invention, a communication interface circuit for interfacing a processor with a plurality of application devices is provided. Circuitry monitors input/output (I/O) addresses passed on a data transfer bus of the processor and provides a first enable signal when one of the I/O addresses indicates that operation of the communication interface circuit has been requested by the processor. Control logic, responsive to the first enable signal, is then permitted access to data passed on the data transfer bus associated with the one I/O address. The data passed on the bus takes the form of configuration data, used to adapt the interface circuit to operator prescribed conditions, and application or informational data to be passed to a desired appliation device once the interface circuit has been configured as desired. The control logic interprets the configuration data and produces a second enable signal in accordance therewith. A programmable interrupt controller enables one of a plurality of available interrupts in accordance with the configuration data. This occurs when the interrupt controller receives the second enable signal. A programmable direct memory access (DMA) controller selects one of a plurality of available DMA lines in accordance with the configuration data when the DMA controller receives the second enable signal. A programmable timing controller provides a timing control rate corresponding to a selected one of the application devices in accordance with the configuration data when the timing controller receives the second enable signal. A serial communication controller serializes the application data associated with the one I/O address when the serial communication controller receives the second enable signal. The serialized data is passed to the selected one application device in accordance with the enabled interrupt, the selected one DMA line and the provided timing control rate.

DESCRIPTION OF THE DRAWINGS

FIGS. 2–6 are the detailed schematic and logic diagrams of a preferred embodiment communication interface circuit having four Military Standard MIL-STD-188-114 communication channels available;

FIG. 6 is the detailed diagram of the power source and the identities of the signals passing between the communication interface circuit and the input/output (I/O) bus of the host personal computer.

DESCRIPTION OF THE PREFERRED EMBODIMENT

Figure 1:
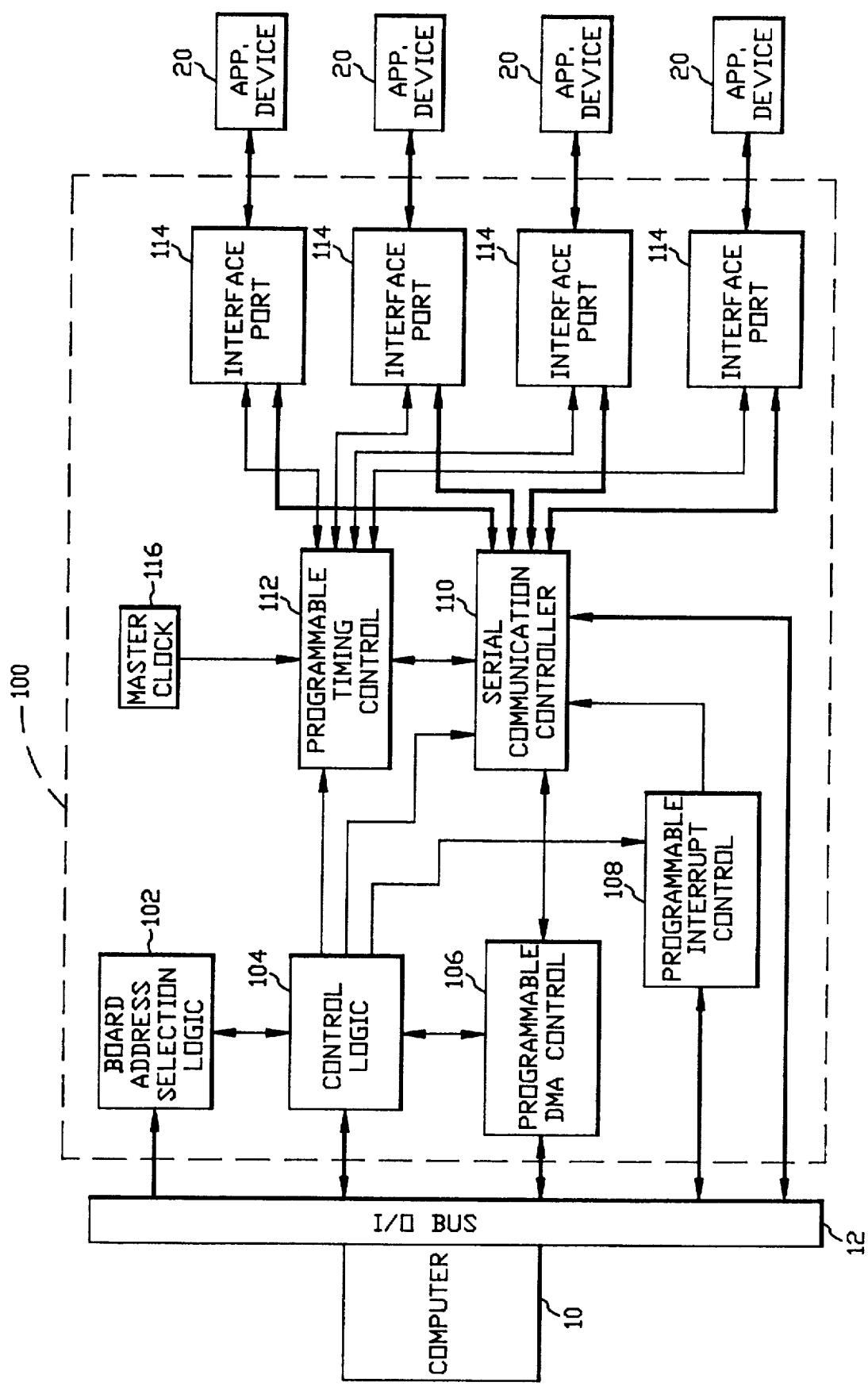
FIG. 1 is a functional block diagram of the communication interface circuit according to the present invention.

Referring now to the drawings, and in particular to FIG. 1, communication interface circuit 100 is shown as a functional block diagram. A microprocessor based personal computer 10 communicates with a plurality of application devices 20 (e.g. printer, modem, etc.) through interface circuit 100. While the present invention is shown and will be described as being connected with four application devices 20, interface circuit 100 may be adapted to interface with a greater or lesser number of application devices. Further, for purposes of description, the personal computer 10 will be operating at the microprocessor speed range of an IBM PC/AT, although it could also be designed to operate at the speed of other processors such as the 386 microprocessor.

Personal computer 10 is connected to interface circuit 100 via input/output (I/O) bus 12 which passes both configuration and application data to and from personal computer 10. I/O bus 12 is directly connected to a plurality of functional circuits including board address selection logic 102, control logic 104, programmable direct memory access (DMA) control 106, programmable interrupt control 108 and serial communication controller 110. A programmable timing control 112 is indirectly connected to I/O bus 12 via control logic 104 and serial communication controller 110, with a plurality (four for the embodiment shown) interface ports 114 being indirectly connected to I/O bus 12 via serial communication controller 110. As will be explained further below, a clock signal from clock 116 may be provided to programmable timing control 112. Clock 116 is independent of any clock of personal computer 10. In FIG. 1, dual arrowed lines of connection indicate that full duplex communication exists between the connected functional blocks.

In operation, board address selection logic 102 monitors addresses passed on I/O bus 12. When an address indicates that interface circuit 100 has been requested by personal computer 10, board address selection logic 102 issues an enable signal to control logic 104. Once enabled, control logic 104 is permitted access to I/O bus 12 and, accordingly, any data associated with the address. Prior to transfer of any application data to a particular application device 20, configuration data will be issued by personal computer 10 and appears on I/O bus 12 to initialize the settings of interface circuit 100 associated with the data transfer. In accordance with this configuration data, control logic 104 issues an enable signal to one of the programmable DMA control 106, interrupt control 108, serial communication controller 110 or timing control 112. The enable signal from control logic 104 permits the enabled element to access I/O bus 12 to receive the configuration data associated with the I/O address. After the configuration of interface circuit 100, control logic 104 issues an enable signal to serial communication controller 110 to pass application data to a selected application device 20.

With respect to DMA control 106, the configuration data would select one of the available DMA lines for the data transfer. With respect to interrupt control 108, the configuration data would specify which of the available interrupts will be used for the data transfer. Devices used to construct DMA control 106 and interrupt control 108 are tri-state devices offering "enable", "disable", and "high impedance" connection options. By this arrangement, the DMA lines and interrupts not being used by the current data transfer are available to the other application devices. Such capability is not available in the conventional hard wired or switched communication card.

Timing control 112 is instructed by the configuration data to act in one of either a master or slave mode. In the master mode, timing control 112 uses timing control signals occurring at a baud rate that is set through personal computer 10. Accordingly, timing control 112 is coupled to a dedicated clock 116 that is used to generate timing control signals that drive interface ports 114. Alternatively, in the slave mode, timing control 112 disconnects clock 116 and monitors or slaves itself to the timing requirements of the particular application device 20 to set its timing control signals to be in accordance with the device.

After the configuration of interface circuit 100 is complete, application data transfer between personal computer 10 and one of the application devices 20 may take place.

In the case of a data transfer from personal computer 10 to a particular application device 20, personal computer 10 places application data on I/O bus 12, causing control logic 104 to issue an enable signal to controller 110 as described above. Once enabled, controller 110 serializes the application data passed through it for ultimate distribution to the designated application device 20. This distribution will take place through a corresponding interface port 114. Serial communication controller 110 is a controller that will operate with synchronous, asynchronous, or SDLC/HDLC (Synchronous Data Line Control/High Data Line Control) data streams as required by the particular application device 20 to be used.

Since personal computer 10 typically operates using standard transistor-transistor-logic (TTL) levels, it may be necessary to convert from these levels to the electrical characteristics of the particular application device 20 to be used. For such applications, interface ports 114 will include receivers and drivers known to those skilled in the art that will alter standard TTL to the electrical characteristics understood by the particular application devices 20.

In the case of a data transfer from a particular application device 20 to personal computer 10, standard request and acknowledge protocol is exchanged in order to set-up such a transfer as is well known in the art. Interface circuit 100 is then initialized as described above with respect to DMA, interrupt and timing control. Data is passed from the particular application device's corresponding interface port 114 through serial communication controller 110. The data is then made available to I/O bus 12.

By way of example, a detailed schematic diagram of the communication interface circuit 100 is shown in FIGS. 2–6 as constructed to provide four MIL-STD-188-114 communication channels.

Figure 2A:
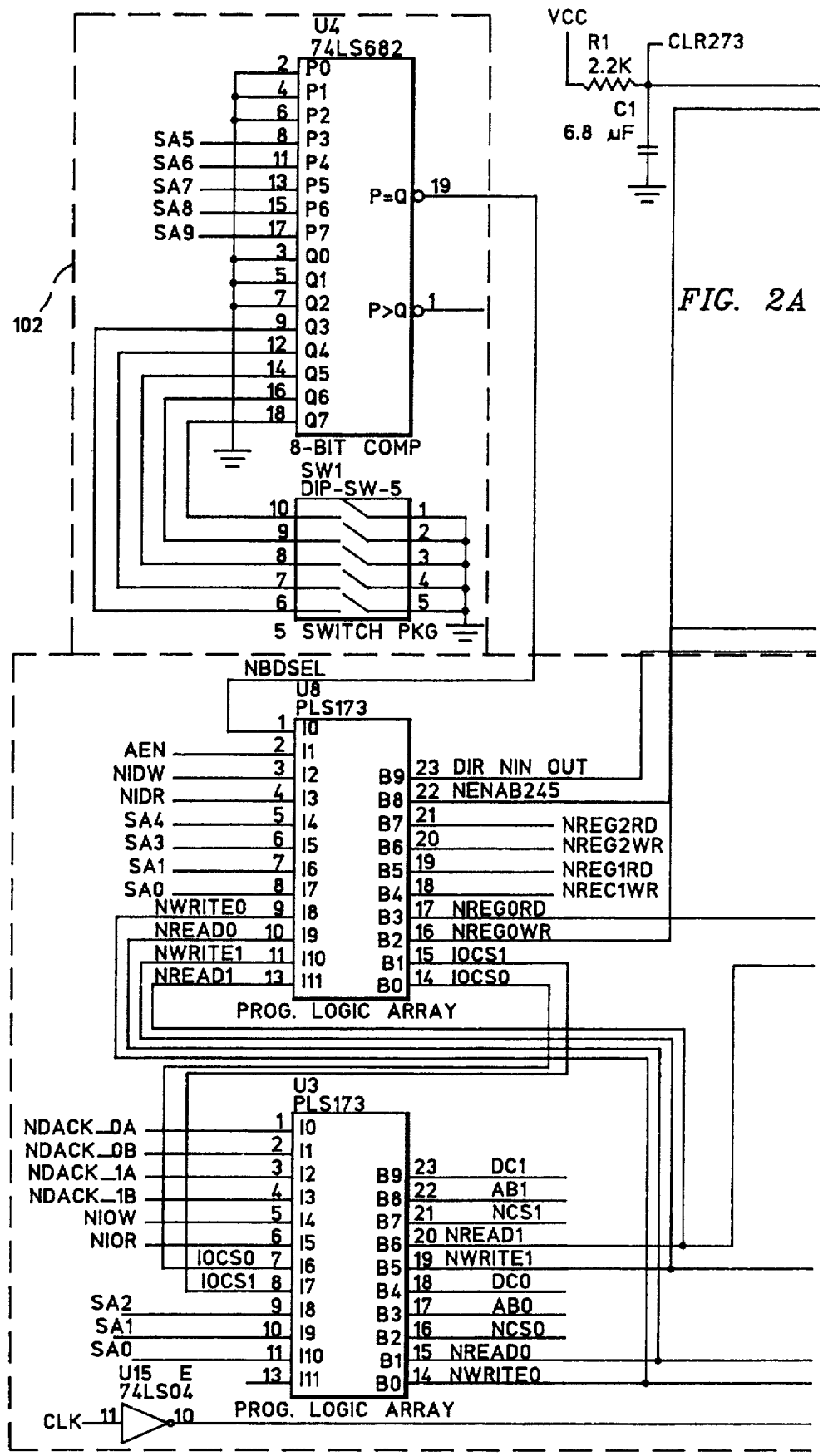
FIGS. 2A and 2B are the detailed diagrams of the board address selection logic 102 and the control logic 104 (in part) shown in FIG. 1.
Figure 2B:
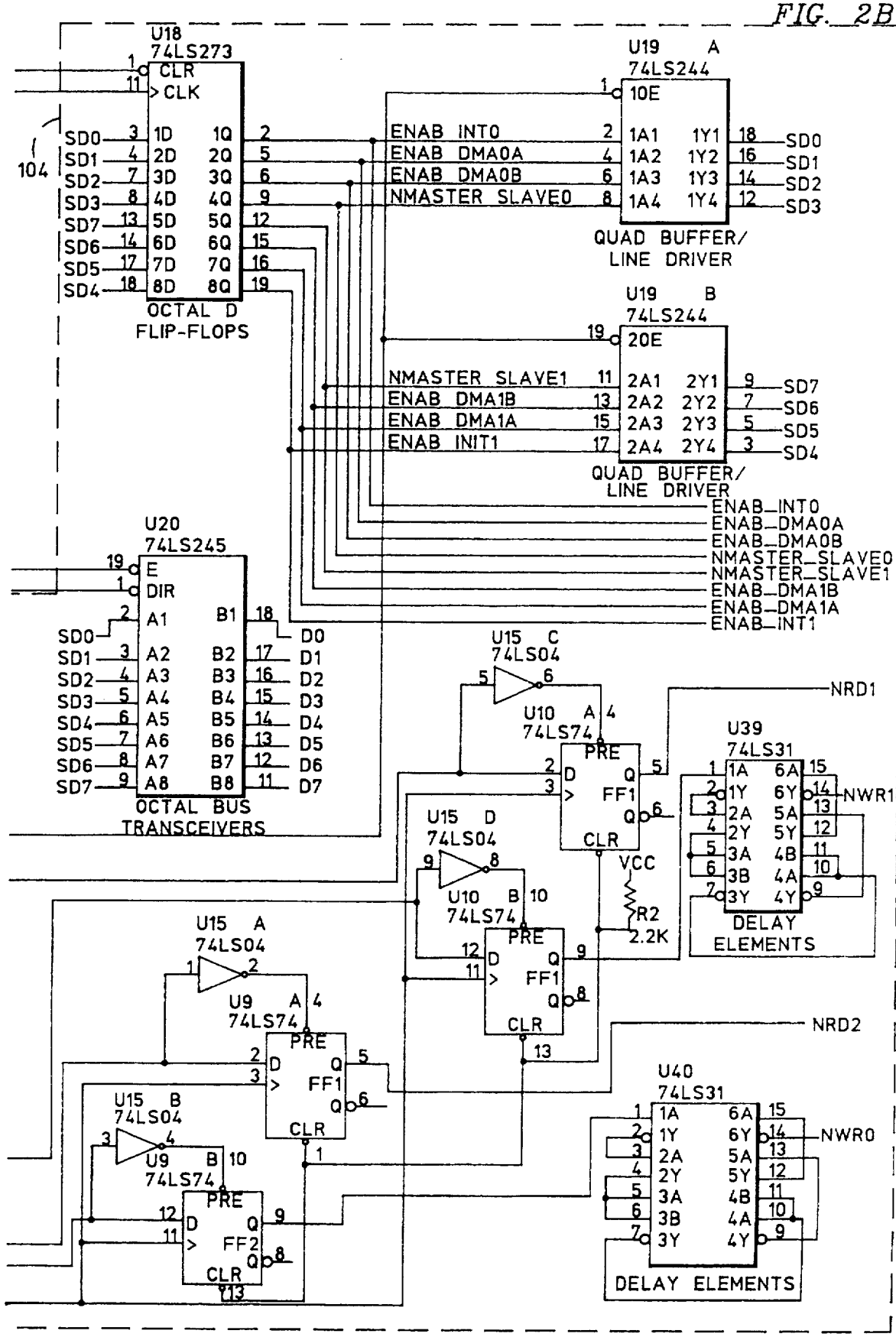

MIL-STD-188-114 signal specifications call for a balanced signal (±5 volts) to provide a reliable and noise-free connection. The voltages can range from ±4 to ±6 volts. The board address selection logic 102 and most of control logic 104 are shown in FIGS. 2A and 2B. Since interface circuit 100 operates in the personal computer's I/O address space, ten address bits (SA9–SA0) are used. The five least significant bits (SA9–SA5) are used for board selection purposes and are switch selective using SW1.

Figure 3A:
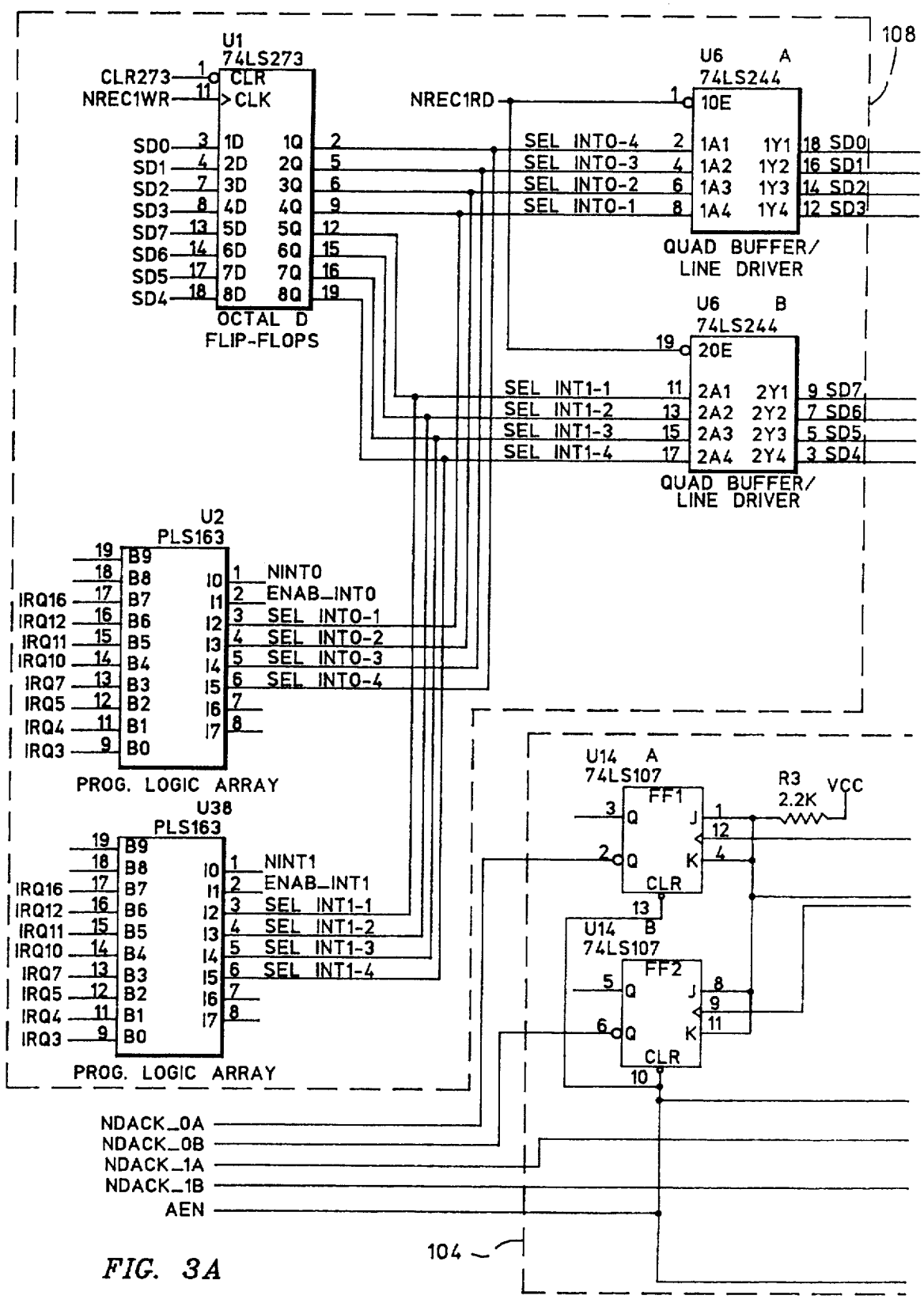
FIGS. 3A and 3B are the detailed diagrams of the programmable direct memory access (DMA) control 106, the programmable interrupt control 108 and the control logic 104 (in remainder) shown in FIG. 1.
Figure 3B:
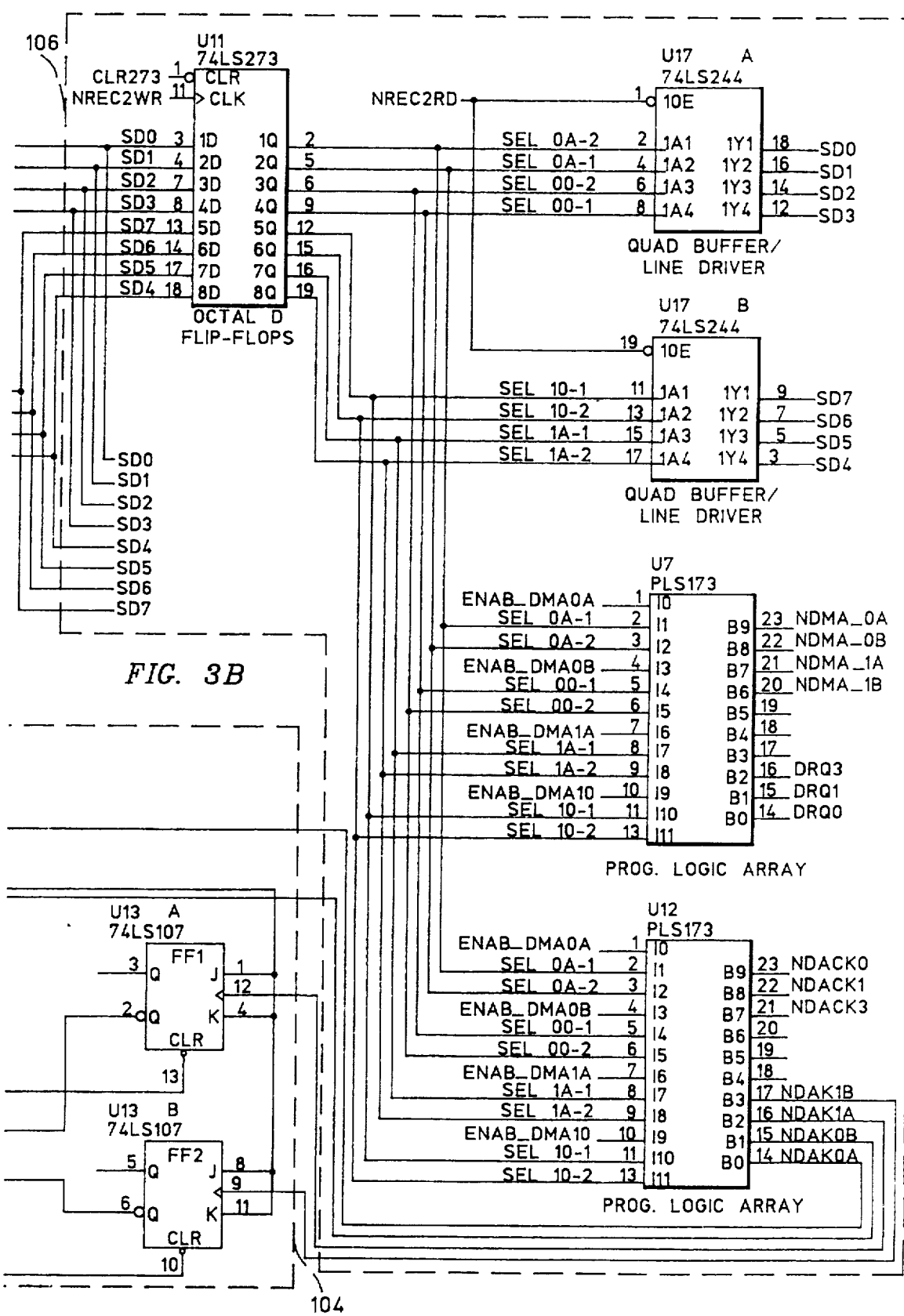

FIGS. 3A and 3B illustrate the detailed diagram for the DMA and interrupt controls 106 and 108, respectively, and the remainder of control logic 104.

Figure 4A:
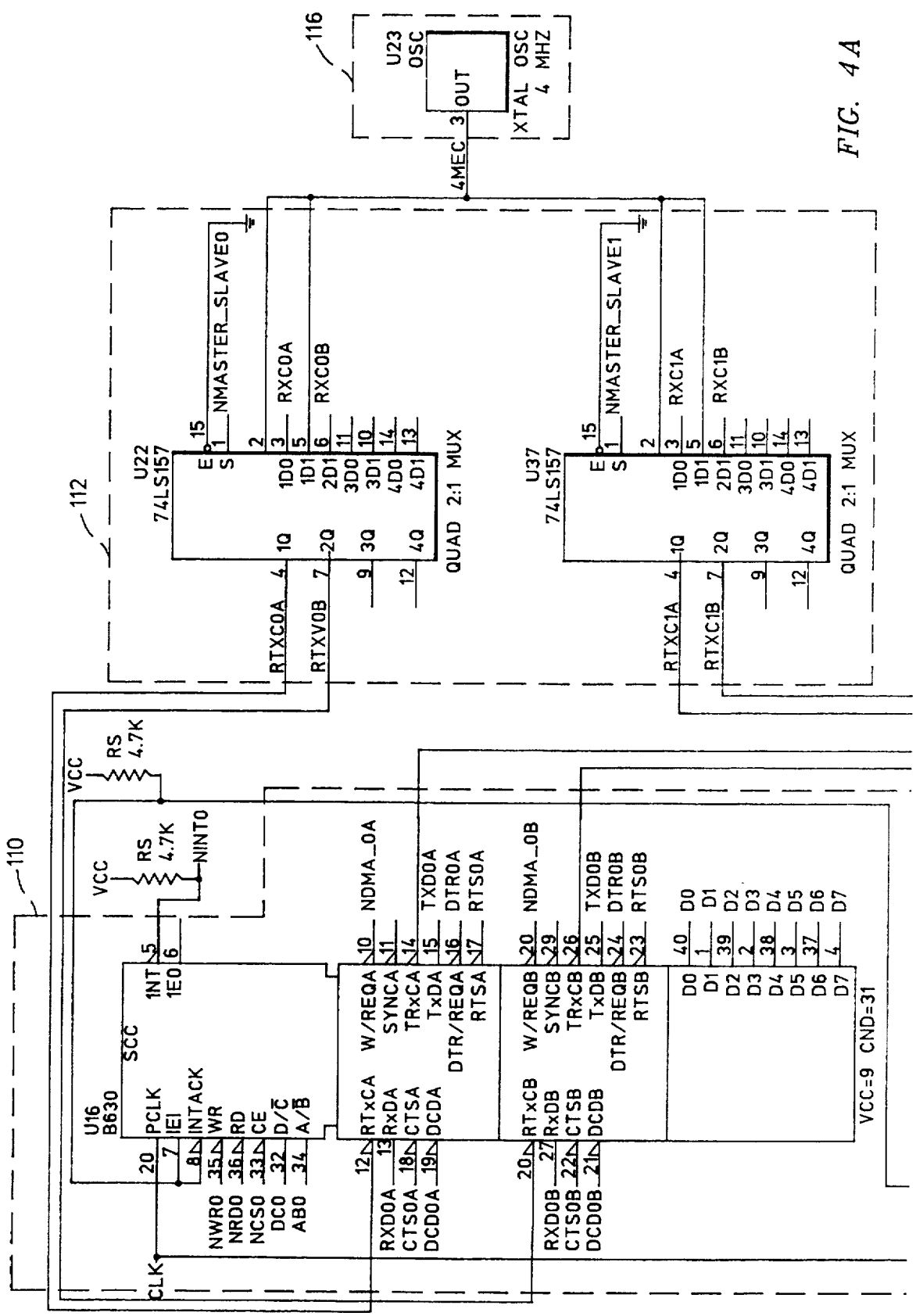
FIGS. 4A and 4B are the detailed diagrams of the serial communication controller 110, the programmable timing control 112 and clock 116 shown in FIG. 1.
Figure 4B:
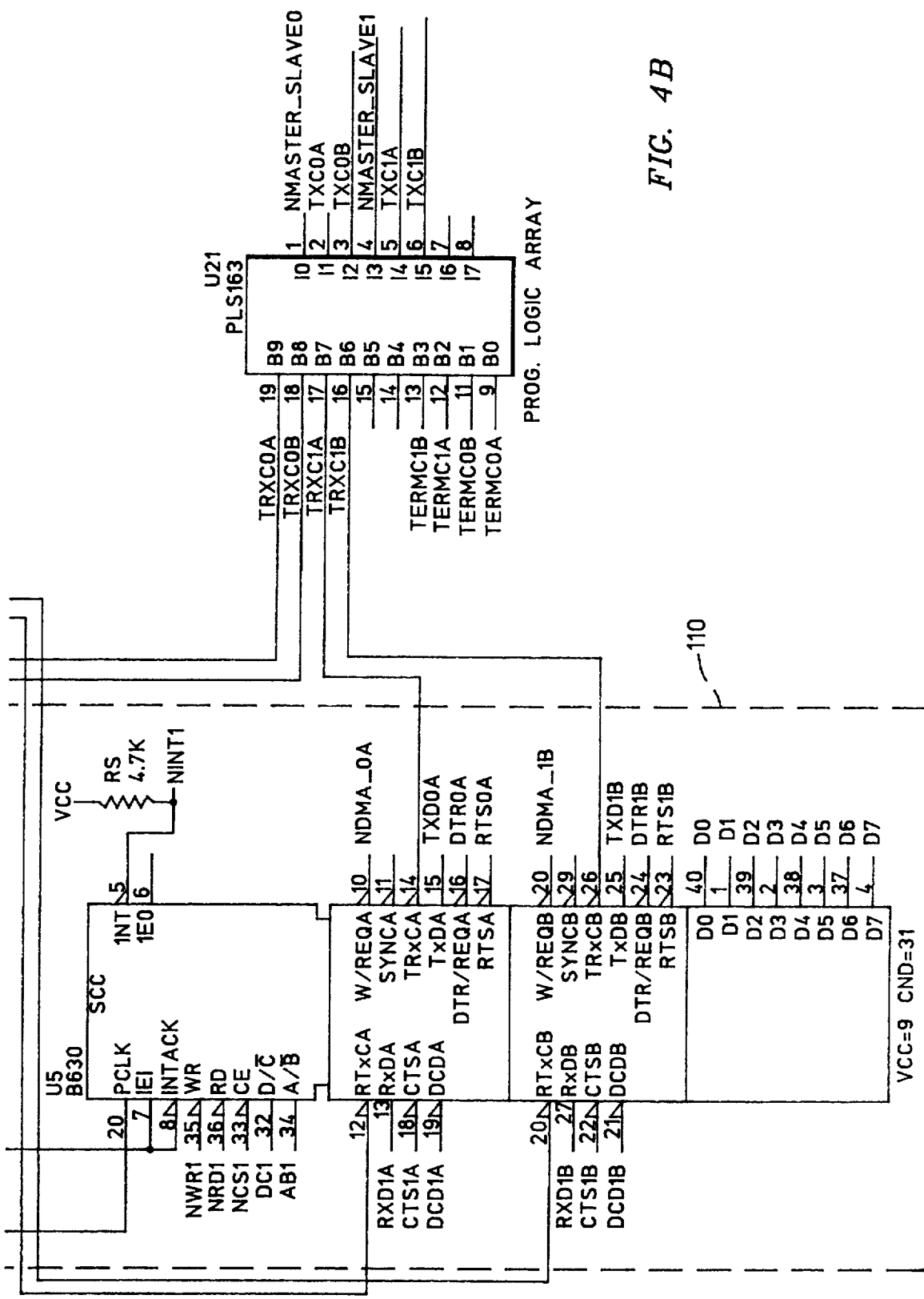

FIGS. 4A and 4B show the detailed pin connections of serial communication control 110, programmable timing control 112 and clock 116. In this preferred embodiment, two Z8530 serial communication chips (SCC) manufactured by Zilog, Inc. (Campbell, Calif.) have been used to provide the four channels of (duplex) communication. Each Z8530 SCC provides two independent channels which are software controlled as described above. For compatibility with AT-style computers, 10 MHz SCCs are used. Clock 116 provides a constant baud rate time base regardless of the system's frequency.

Figure 5A:
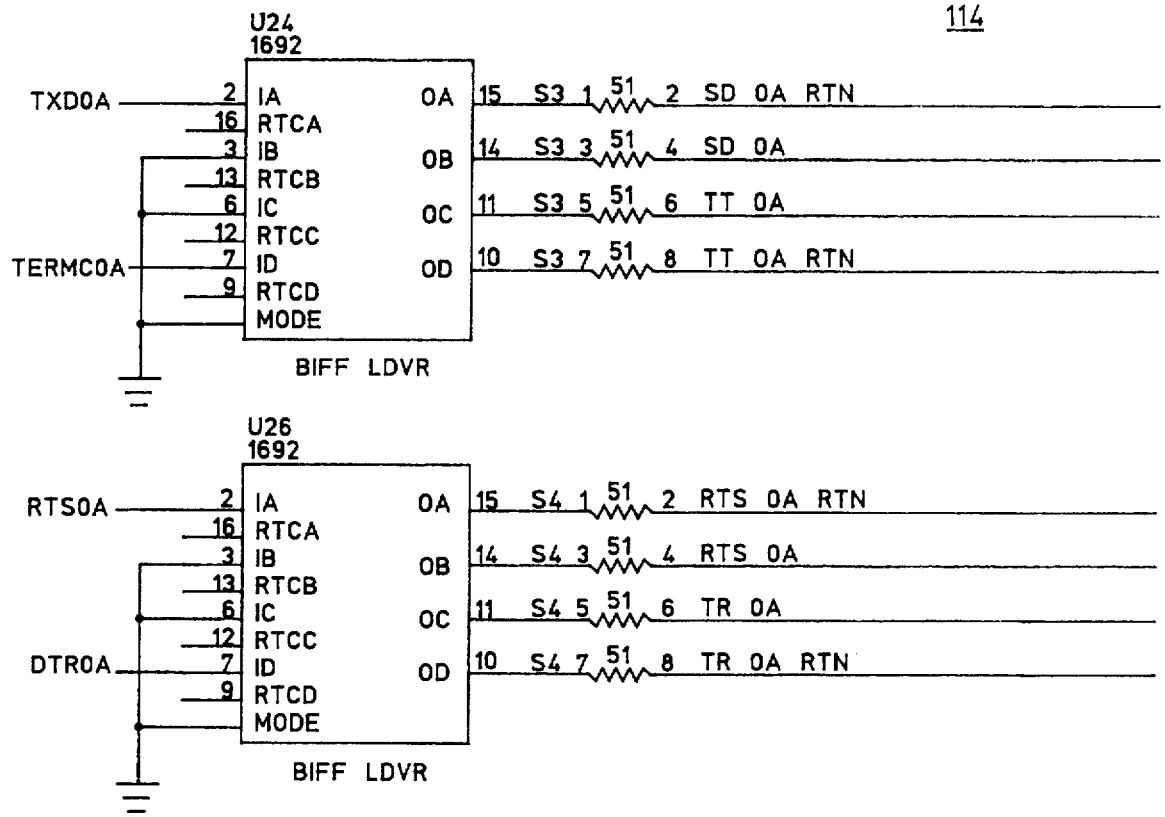
FIGS. 5A–5H are the detailed diagrams for the four interface ports 114 shown in FIG. 1.
Figure 5A:
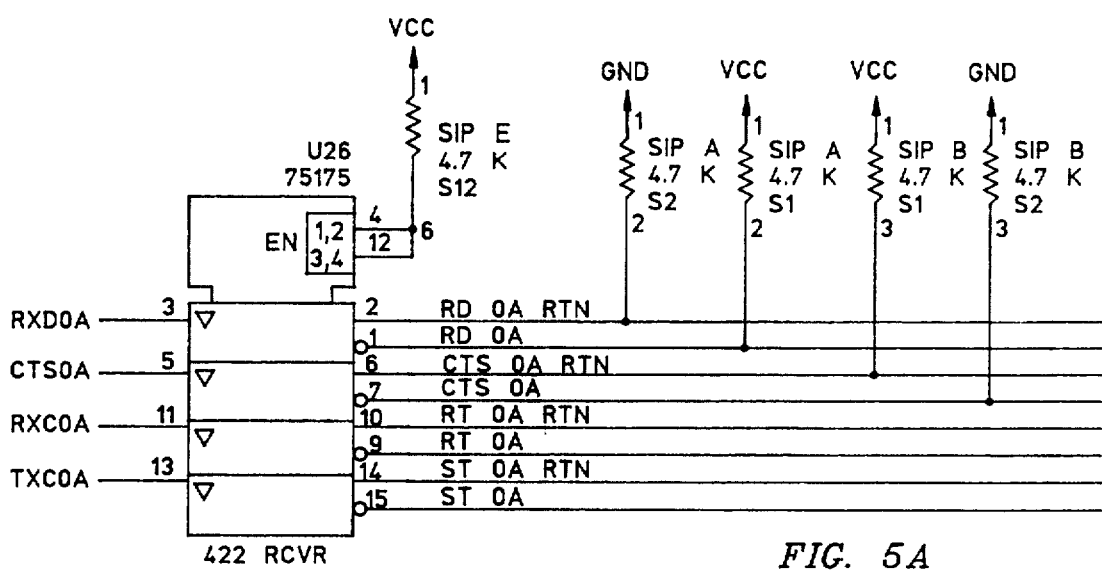
Figure 5B:
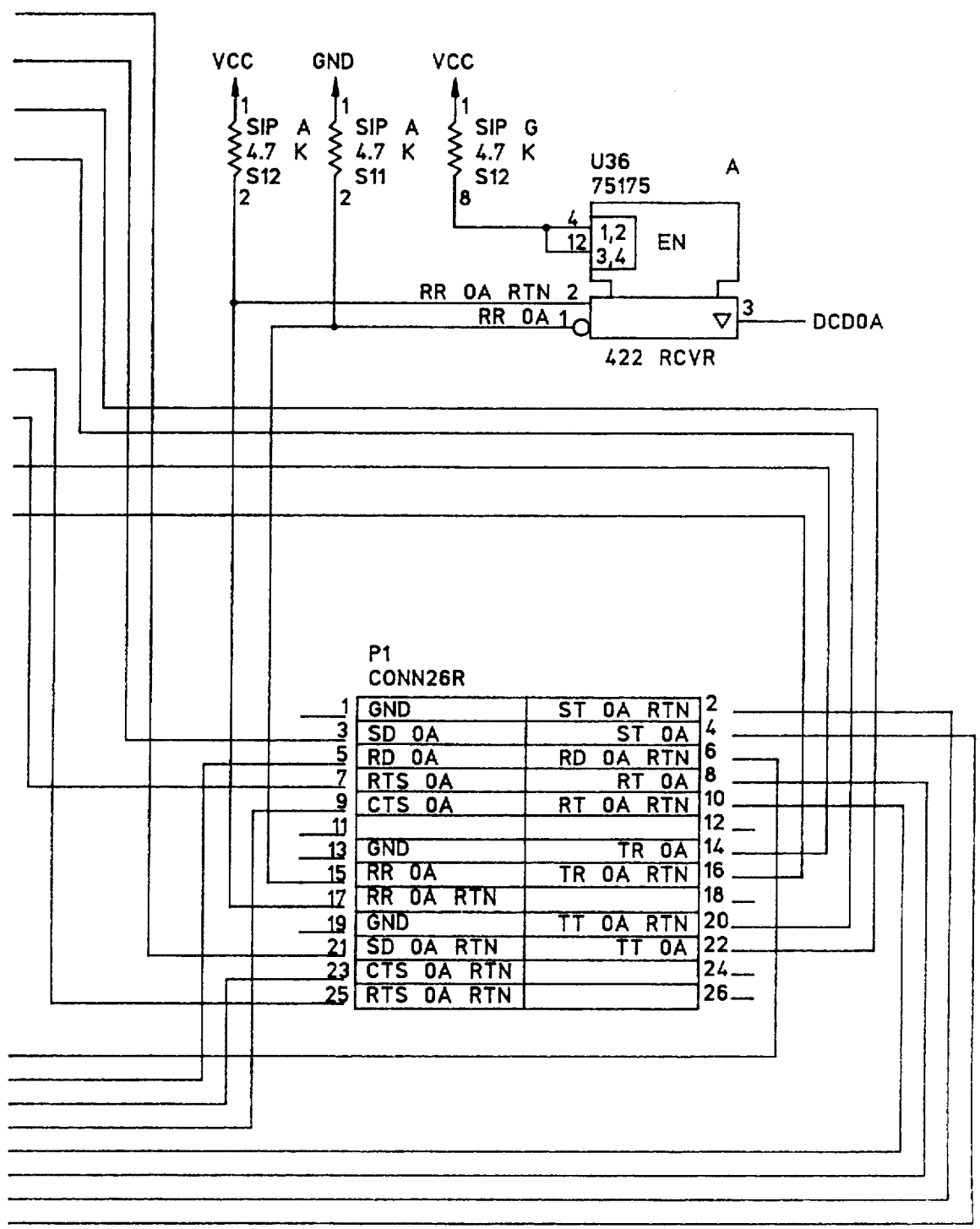
Figure 5C:
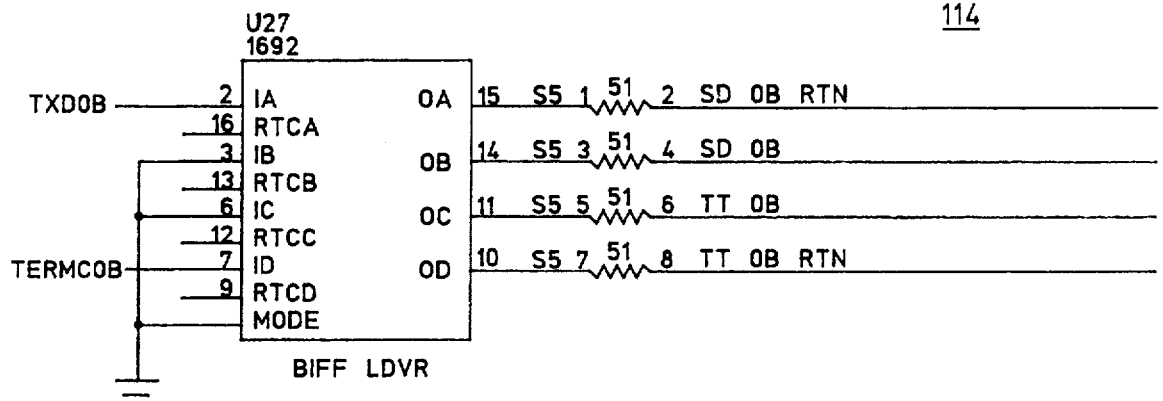
Figure 5C:
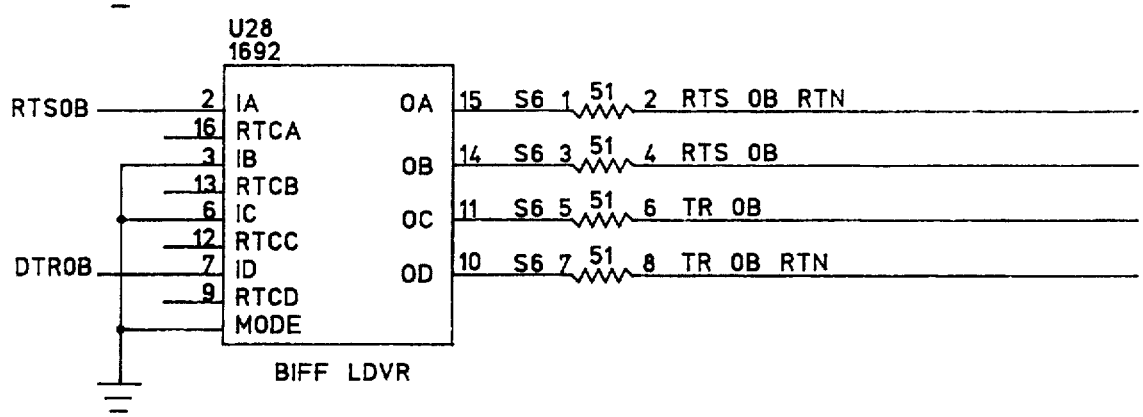
Figure 5C:
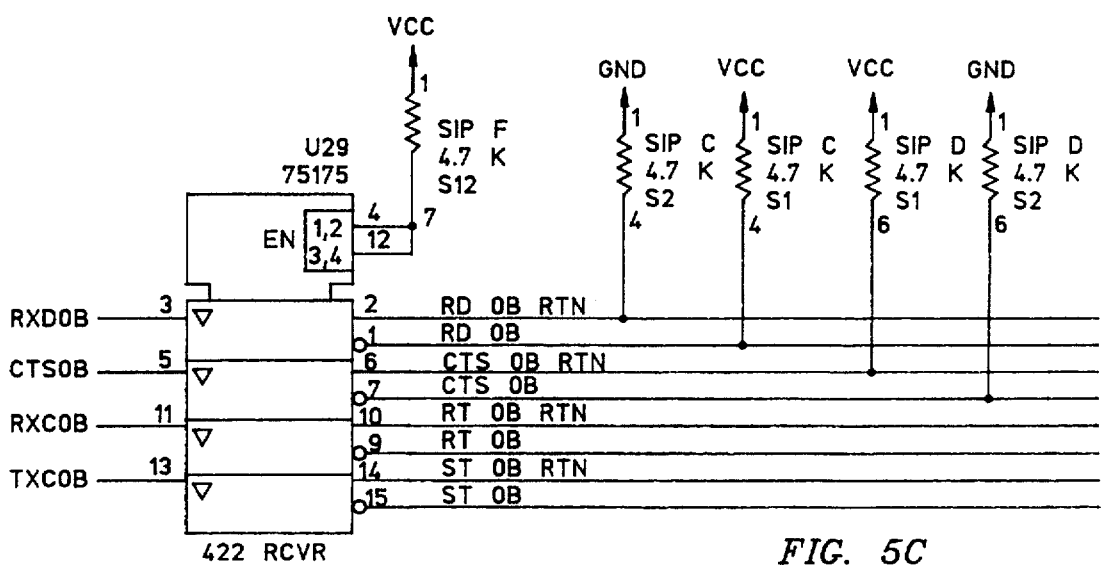
Figure 5D:
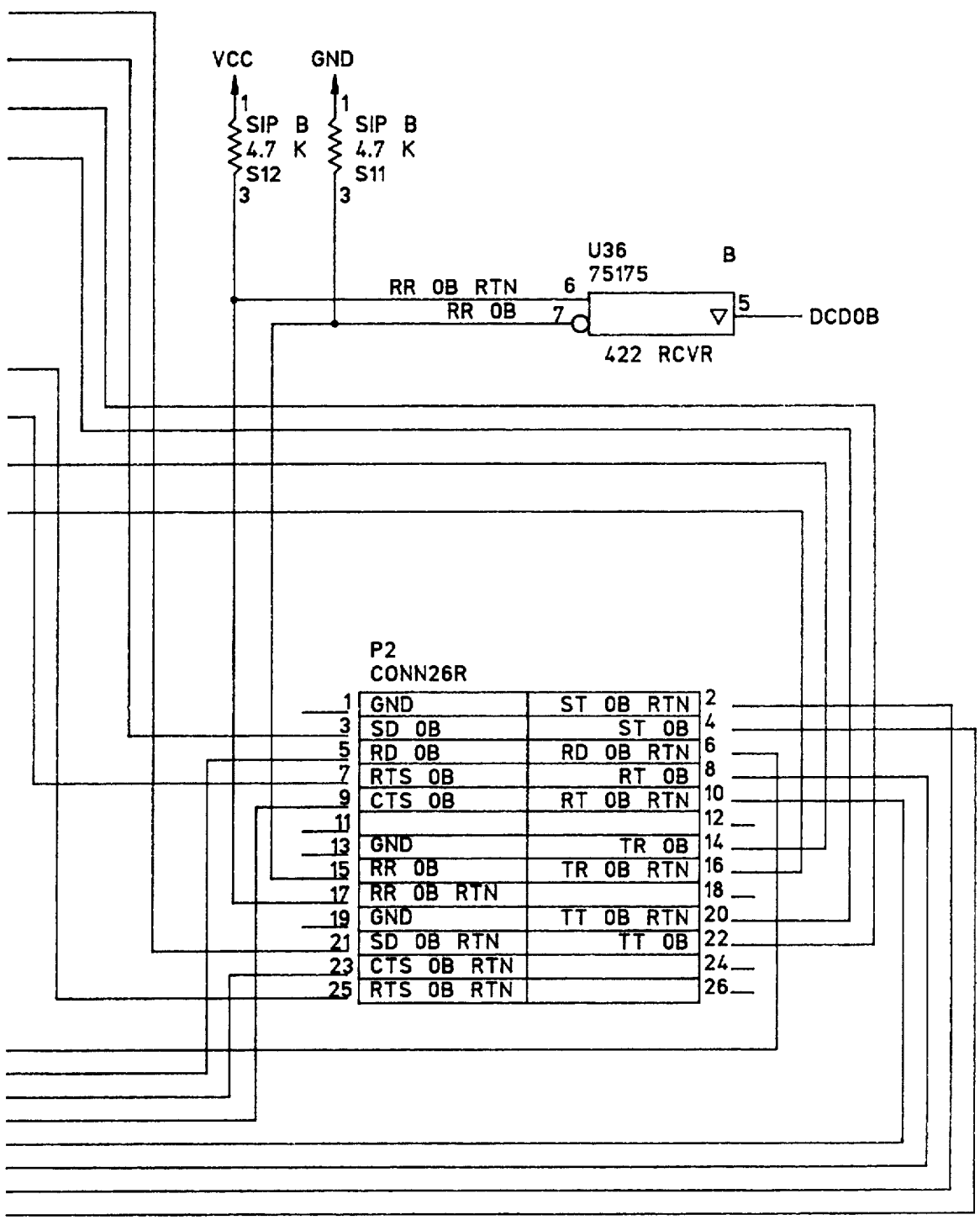
Figure 5E:
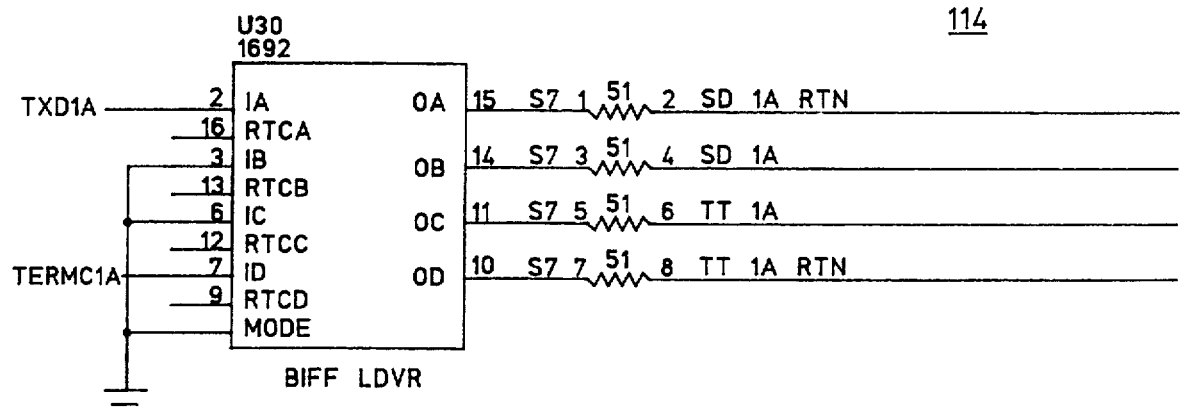
Figure 5E:
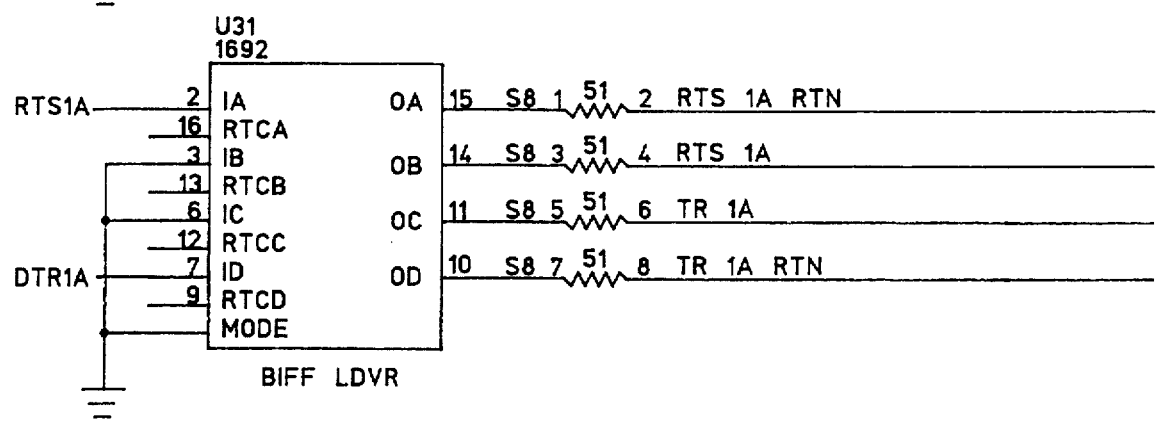
Figure 5E:
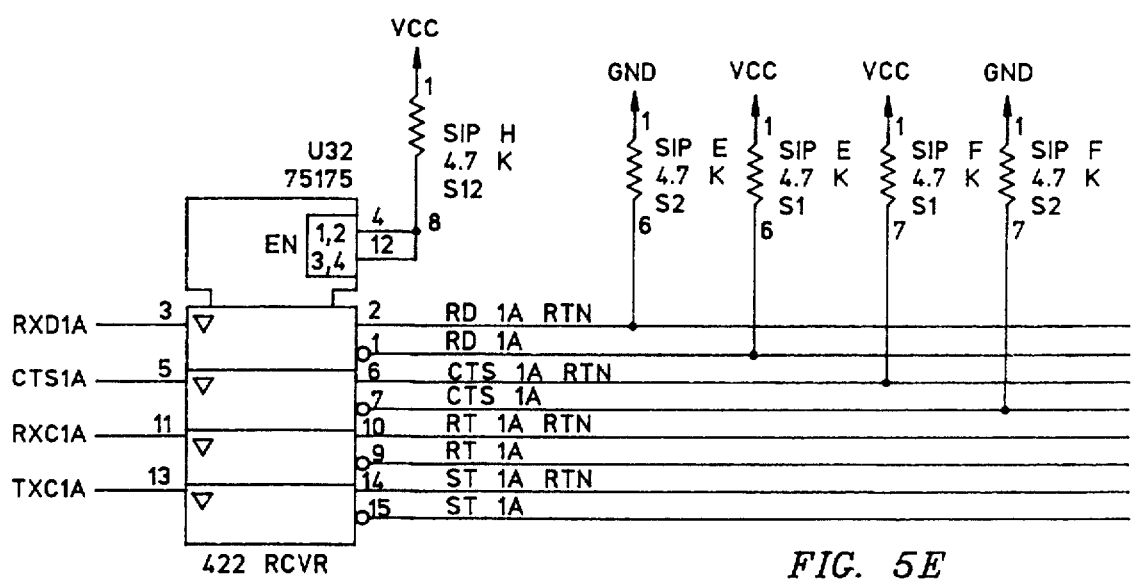
Figure 5F:
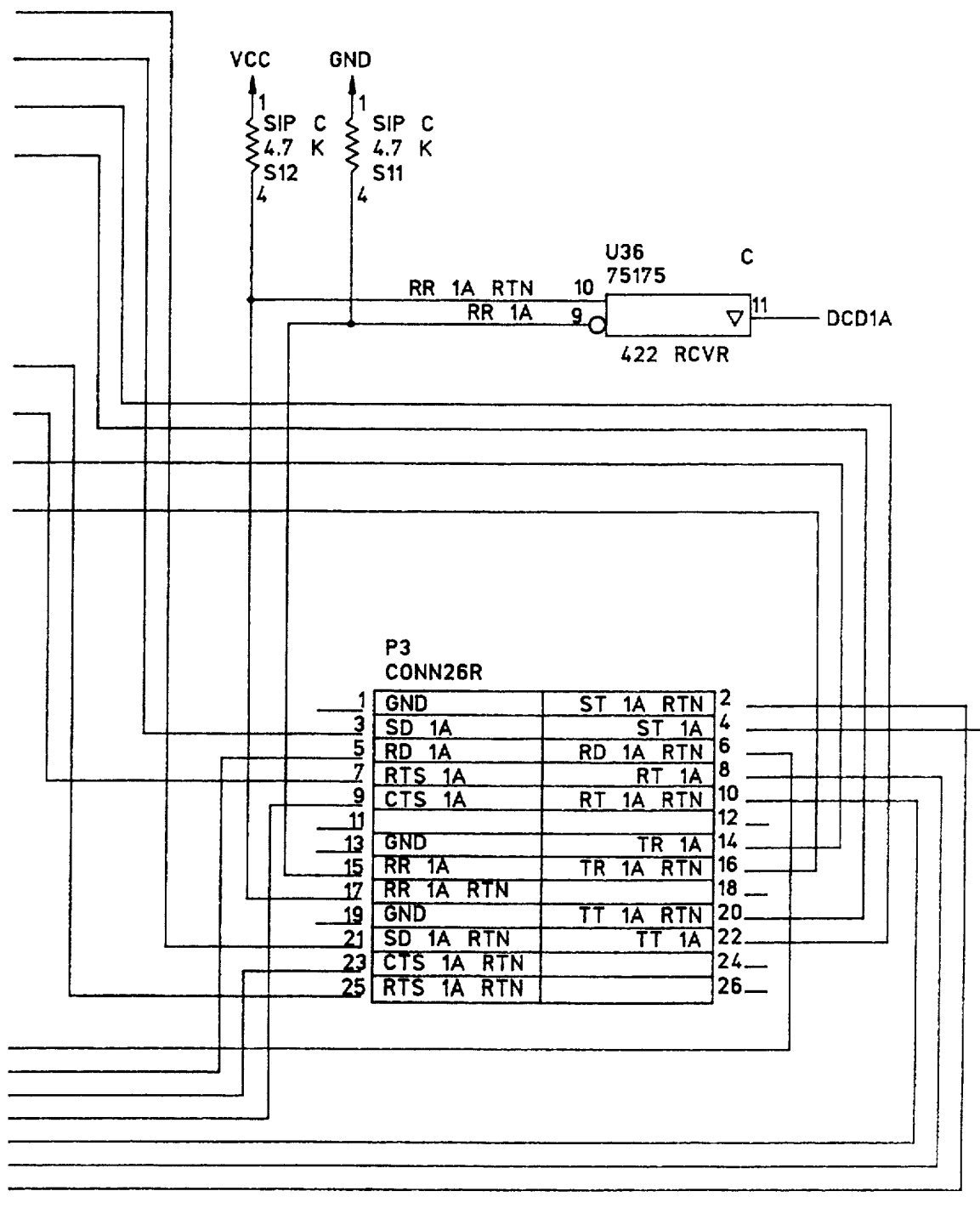
Figure 5G:
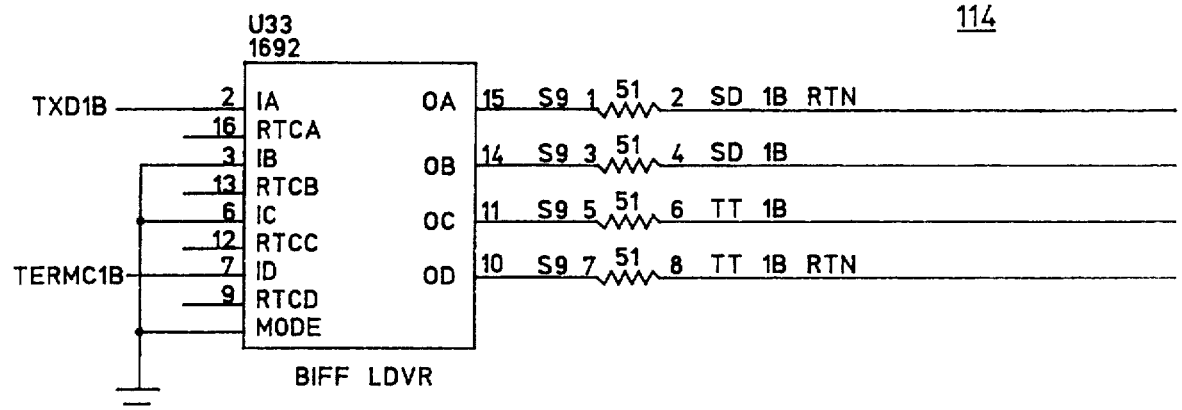
Figure 5G:
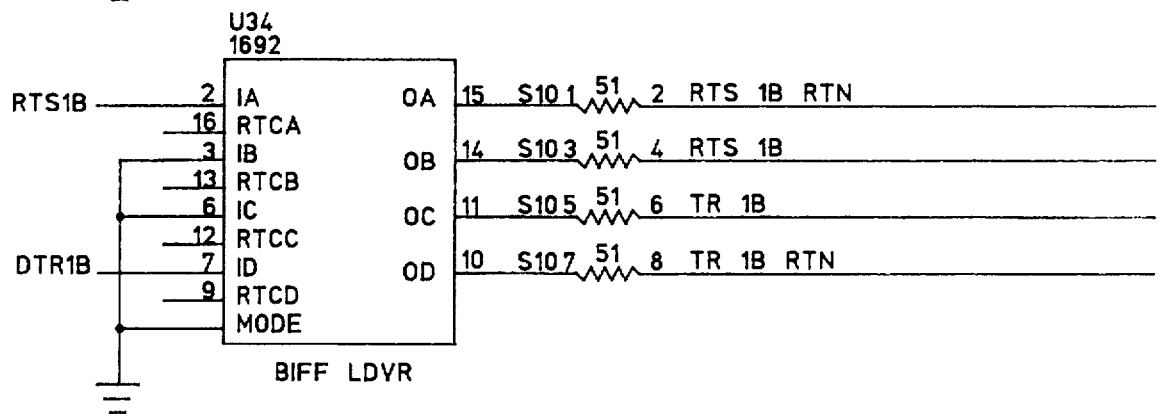
Figure 5G:
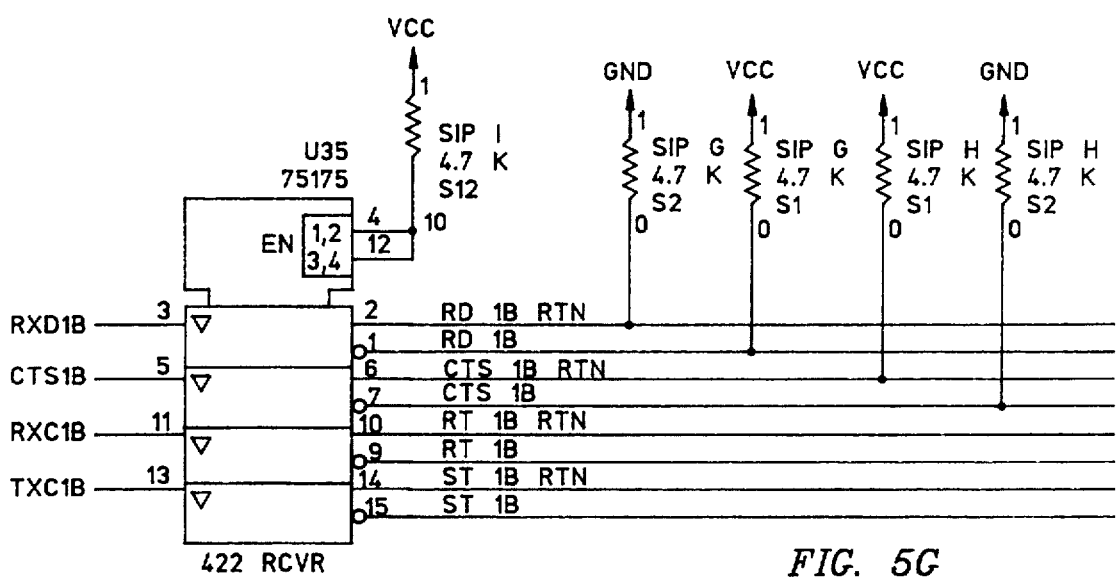
Figure 5H:
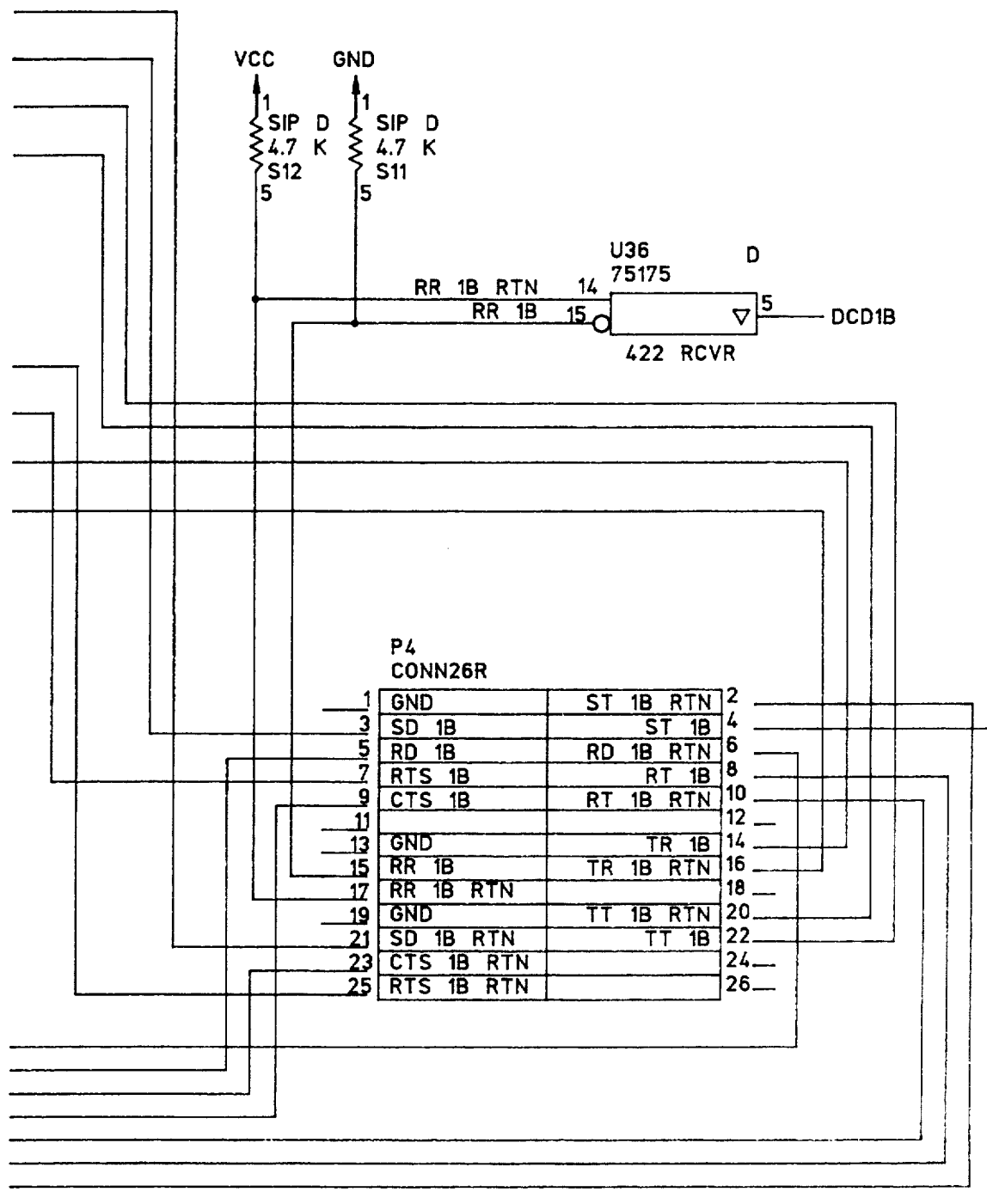

FIGS. 5A–5H show the detailed diagrams of the receivers and drivers used for ports 114 to meet the 4–6 volt range specified by MIL-STD-118-114. Note that each respective port is depicted by a pair of figures (i.e., the first port is shown in FIGS. 5A and 5B, the second port is shown in FIGS. 5C and 5D, etc.).

Figure 6:
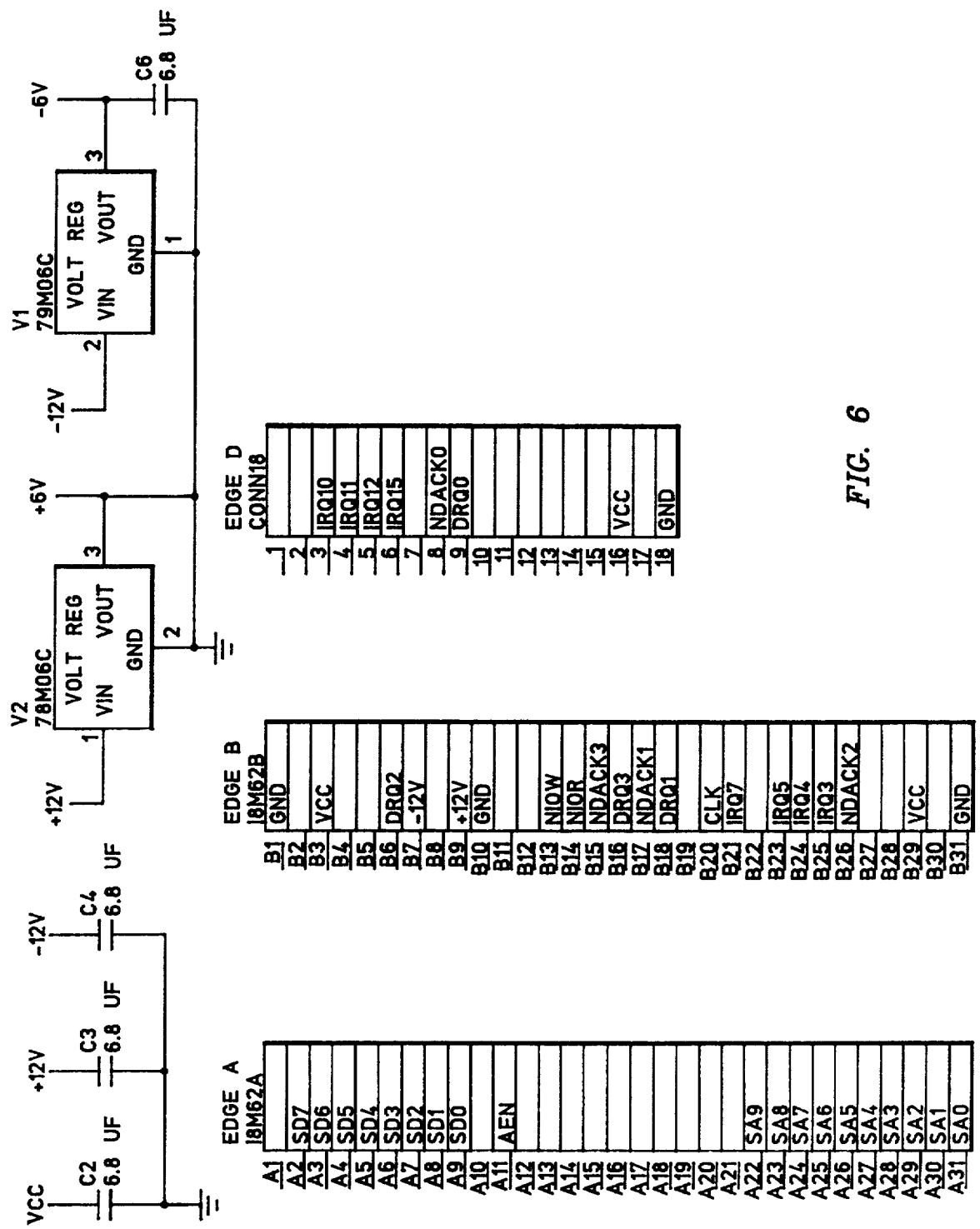

FIG. 6 shows the power source for interface circuit 100 and provides a detailed view of the identity of the signals passed between the communication interface circuit 100 and the I/O bus 14 where:

configuration and application data is passed over SD0–SD7,

I/O addresses of programmable elements of the invention are passed over SA0–SA9, control signals for the interrupt, DMA and serial controller are passed over nIOR, nIOW, AEN, IRQ3–IRQ5, IRQ7, IRQ10–IRQ12, IRQ15, DRQ0, DRQ1, DRQ3, nDACK0, nDACK1, and nDACK3, synchronization is passed over CLK, and power is passed over VCC and GND.

The types and functions of the various circuits shown but not identified in FIGS. 2–6 are given below as follows:

| Part Name | Description |
|---|---|
| 74LS04 | Hex Inverter |
| 74LS74 | Dual D-Type Flip Flop |
| 74LS107 | J-K Type Flip Flop |

The advantages of the present invention are numerous. The communication interface circuit provides a plurality of channels for data transfer between a computer and a plurality of application devices. Rather than requiring hardwiring of interrupt or DMA lines, the present invention allows available interrupts and DMA lines to be software selected. Further, interrupts and DMA lines not enabled are tri-stated to make them available to a computer's I/O bus for use by other applications. The programmable timing control feature allows the interface circuit to adapt to a variety of baud rates based upon application needs. The source for timing control is software controlled such that timing may be dictated by the host computer or by a particular application device. Communication can be carried on with synchronous, asynchronous or SDLC/HDLC data streams. Finally, the interface circuit is compatible with any of the AT style, or 386 microprocessor based personal computers and can be suitably modified to function with even faster microprocessor speeds.

The present invention will be of particular value in many instances. For example, in terms of the preferred embodiment constructed to provide four MIL-STD-188-114 communication channels, the present invention can communicate with the Milstar Satellite Terminal. In another embodiment, the present invention could be configured to operate with a plurality of modems, each modem operating at a different baud rate and connected to a different phone line. In this way, the phones could all be connected to one computer's common data base of information.

Thus, although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A communication interface apparatus for interfacing a processor with a plurality of application devices, comprising:

means for monitoring input/output (I/O) addresses passed on a data transfer bus of said processor, said monitoring means providing a first enable signal when one of said I/O addresses indicates that operation of said communication interface apparatus has been requested by said processor;

control logic means, said first enable signal enabling said control logic means to access configuration data passed on said data transfer bus associated with said one I/O address, said control logic means producing a second enable signal in accordance with said configuration data;

programmable control means, operating in response to said second enable signal, for initializing said communication interface apparatus for a selected one of said application devices based upon timing control, interrupt control and direct memory access (DMA) control commands within said configuration data; and means, operating in response to said second enable signal, for serializing application data passed on said data transfer bus, and for passing said serialized data to said selected one application device in accordance with said timing, interrupt and DMA control commands.

2. A communication interface apparatus as in claim 1 further having means for full duplex communication wherein said application devices pass data to said data transfer bus of said processor.

3. A communication interface apparatus as in claim 1 further comprising means, interfacing said serializing means with said selected one application device, for altering electrical characteristics of said serialized data into electrical characteristics compatible with said selected one application device.

4. A communication interface circuit for interfacing a processor with a plurality of application devices, comprising:

means for monitoring input/output (I/O) addresses passed on a data transfer bus of said processor, said monitoring means providing a first enable signal when one of said I/O addresses indicates that operation of said communication interface circuit has been requested by said processor;

control logic means, said first enable signal enabling said control logic means to access configuration data passed on said data transfer bus associated with said one I/O address, said control logic means producing a second enable signal in accordance with said configuration data;

programmable interrupt control means, operating in response to said second enable signal, for enabling one of a plurality of available interrupts and for tri-stating a remainder of said plurality of available interrupts in accordance with said configuration data;

programmable direct memory access (DMA) control means, operating in response to said second enable signal, for selecting one of a plurality of available DMA lines and for tri-stating a remainder of said plurality of available DMA lines in accordance with said configuration data;

programmable timing control means, operating in response to said second enable signal, for providing a timing control rate corresponding to a selected one of said application devices in accordance with said configuration data; and a controller, operating in response to said second enable signal, for serializing application data associated with said one I/O address, and for passing said serialized data to said selected one application device in accordance with said enabled interrupt, said selected one DMA line and said provided timing control rate.

5. A communication interface circuit as in claim 4 further comprising means, interfacing said controller with said selected one application device, for altering electrical characteristics of said serialized data to electrical characteristics compatible with said selected one application device.

6. A communication interface circuit as in claim 4 further having means for full duplex communication wherein said application devices pass data to said data transfer bus of said processor.

7. A communication interface circuit as in claim 4 wherein said configuration data distributed to said programmable timing control means dictates said timing control rate, said communication interface circuit further comprising a clock for providing an independent clock signal to said programmable timing control means wherein said independent clock signal is at a rate that is used as said timing control rate.

8. A communication interface circuit as in claim 4 wherein said configuration data distributed to said programmable timing control means dictates that said timing control rate will correspond to said selected one application device.

* * * * *